United States Patent [19]

Rehmer et al.

[11] Patent Number: 5,180,756
[45] Date of Patent: Jan. 19, 1993

[54] AGENTS CURABLE BY ULTRAVIOLET RADIATION

[75] Inventors: Gerd Rehmer, Beindersheim; Andreas Boettcher, Nussloch, both of Fed. Rep. of Germany

[73] Assignee: BASF Aktiengesellschaft, Ludwigshafen, Fed. Rep. of Germany

[21] Appl. No.: 505,729

[22] Filed: Apr. 6, 1990

[51] Int. Cl.$^5$ .............................................. C08F 2/50
[52] U.S. Cl. ........................................ 522/35; 522/8; 522/12; 522/21; 522/121; 526/208; 526/316
[58] Field of Search ................. 522/905, 904, 12, 35

[56] References Cited

U.S. PATENT DOCUMENTS

| | | | |
|---|---|---|---|
| 2,160,943 | 6/1939 | Britton | 526/232.1 |
| 3,214,492 | 10/1965 | Tocker | 522/905 |
| 3,574,617 | 4/1971 | Skoultchi | 522/905 |
| 3,661,618 | 5/1972 | Brookman | 522/121 |
| 3,957,921 | 5/1976 | Iwahashi | 260/901 |
| 4,045,514 | 8/1977 | Iwahashi | 260/901 |
| 4,134,814 | 1/1979 | De Poortere | 428/482 |
| 4,533,723 | 8/1985 | Weitemeyer | 528/303 |
| 4,537,667 | 8/1985 | Bishop et al. | 522/1 |
| 4,638,018 | 1/1987 | Baudvin | 522/103 |
| 4,737,559 | 4/1988 | Kellen | 526/291 |
| 4,820,745 | 4/1989 | Muller | 522/90 |
| 4,822,829 | 4/1989 | Muller | 522/90 |
| 4,847,137 | 7/1989 | Kellen | 428/195 |
| 4,914,004 | 4/1990 | Kohler | 522/905 |

FOREIGN PATENT DOCUMENTS

| | | |
|---|---|---|
| 0017364 | 10/1980 | European Pat. Off. |
| 88300 | 9/1983 | European Pat. Off. |
| 2411169 | 9/1974 | Fed. Rep. of Germany |
| 586297 | 3/1947 | United Kingdom |

OTHER PUBLICATIONS

Otsu et al., Polymer Bulletin, vol. 7, 1982, pp. 45-50, "Living Radical Polymerizations ... ".
Otsu et al., Polymer Bulletin, vol. 11, 1984, pp. 135-142, "Living Mono-and Biradical Polymerizations ... ".
Otsu et al., J. Macromol. Sci-Chem., A21 (889), 1984, pp. 961-977.

*Primary Examiner*—Marion E. McCamish
*Assistant Examiner*—Arthur H. Koeckert
*Attorney, Agent, or Firm*—Oblon, Spivak, McClelland, Maier & Neustadt

[57] ABSTRACT

Agents which are curable by ultraviolet radiation are based on a binder formulation of (1) from 99.0 to 20% by weight of a copolymer, (2) from 1.0 to 80% by weight of monoolefinically unsaturated compounds and (3) from 0.0 to 20% by weight of polyolefinically unsaturated compounds. The agents contain copolymers (1) which are obtainable by subjecting a mixture of (A) from 80 to 99.9% by weight of olefinically unsaturated monomers, (B) from 0 to 10% by weight of a copolymerizable olefinically unsaturated photoinitiator and (C) from 0 to 10% by weight of a polymerization-regulating photoinitiator to free radical polymerization, the sum of (B) and (C) being not less than 0.1% by weight and the stated percentages by weight being based on the sum of the weights of (A)+(B)+(C).

13 Claims, No Drawings

AGENTS CURABLE BY ULTRAVIOLET RADIATION

The present invention relates to agents which are curable by ultraviolet radiation and are based on a binder formulation of
(1) from 99.0 to 20% by weight of a copolymer,
(2) from 1.0 to 80% by weight of monoolefinically unsaturated compounds and
(3) from 0.0 to 20% by weight of polyolefinically unsaturated compounds.

It is an object of the present invention to provide UV-crosslinkable agents which are distinguished by high reactivity to UV radiation, the use of low molecular weight copolymers, the omission of polymer-analogous reactions (no acylation step), smaller amounts of volatile constituents and the release of a smaller amount of photolysis products capable of migration.

It is a further object of the present invention to provide agents which, when used as contact adhesives, have a low viscosity, have a high shear strength both at room temperature and at elevated temperatures after exposure to UV radiation and possess a high peel strength and are very tacky to the touch.

German Laid-Open Application DOS 3,613,082 discloses the preparation of radiation-curable (UV radiation and electron beams) (meth)acrylated polyesters and their use for the preparation of contact adhesives The disadvantages here are as follows: the UV-crosslinked contact adhesive layers have little tack. The products crosslinked in the air do not meet the requirements set for a contact adhesive. The preparation is particularly expensive, and in particular it is not possible to dispense with the reaction with olefinically unsaturated compounds.

Furthermore, German Patent 3,323,913 discloses the preparation and use of polyisobutylenesuccinic half esters and their use for the preparation of an adhesive. However, these products do not meet the high requirements set for a contact adhesive. In particular, these products must be subjected to a polymer-analogous reaction with compounds containing double bonds.

German Patent 2,621,096 describes halogencontaining photopolymerizable adhesives based on polycondensates and polyadducts. These products contain unsaturated organic compounds which have two or more radicals of acrylic acid or methacrylic acid. The disadvantages here are as follows: these adhesives are predominantly used for lamination; in this case, too, it is not possible to dispense with olefinically unsaturated compounds. In particular, halogenated (chlorinecontaining) starting materials cannot be omitted.

Dutch Patent Application 6 606 711 also discloses pressure sensitive adhesive tapes which are produced by coating a sheet-like substrate with a polyacrylate adhesive, one or more monomeric acrylates, eg. 2-ethylhexyl acrylate, being present and being polymerized by UV irradiation and subsequent heating. However, to obtain useful results, exposure must be effected under an inert gas atmosphere. Moreover, the presence of the readily volatile acrylates, which may irritate the skin and eyes, is a disadvantage.

Furthermore, Dutch Patent 7 009 629 discloses a process for the preparation of adhesives, in which mixtures of acrylates and methacrylates, such as 2-ethylhexyl acrylate, with organic polymers, such as cellulose derivatives, polyolefins or polyesters, as viscosity regulators, and if necessary a tackifier, such as polyvinyl methyl ether, are applied in a thin layer to a sheet-like substrate and treated with high energy radiation. Here, too, the presence of the monomeric (meth)acrylates, which have an irritant effect and are readily volatile, is a disadvantage, and furthermore the only products obtained are those whose cohesion is insufficient for many applications in the contact adhesives sector.

In the process of German Laid-Open Application DOS 2,357,586 for the production of self-adhesive coatings, ionizing radiation is used for exposure, in particular a mixture which is liquid at room temperature and consists of (A) a monoolefinically unsaturated monomer which forms tacky polymers at room temperature, (B) a diolefinically or polyolefinically unsaturated compound, (C) a polymer having a softening point of less than 50° C. and a mean molecular weight of from 500 to 10,000 and (D) a conventional photoinitiator, for example benzoin, acetophenone or benzophenone, which mixture is likewise applied to a sheet-like substrate. In this process too, acrylates and methacrylates of alkanols of 4 to 12 carbon atoms can be used as monomers (A). Although the adhesive layers produced by this process have a high shear strength at room temperature and good surface tack, they exhibit relatively pronounced cold flow and insufficient shear strengths at elevated temperatures.

Since photoinitiators are present in the case of materials which are to be crosslinked by UV radiation, these photoinitiators should be very highly soluble in the materials and should not be exuded from the materials, so that the latter can be processed even at elevated temperatures. Furthermore, these photoinitiators should not, when exposed, form any decomposition products which have a strong intrinsic odor and tend to be exuded.

Polymerizable photoinitiators have therefore also been used in UV-curable materials. Thus, European LaidOpen Application 0,017,364 describes, for example, copolymers which are suitable, inter alia, as adhesives and for sealing compounds and which contain from 0.1 to 10% by weight of allylbenzoyl benzoate as a polymerized photoinitiator. Although these materials can be crosslinked by UV radiation, they give crosslinked products having a very high viscosity. Moreover, their reactivity to UV radiation is too low, and tacky layers produced therewith do not meet the requirements set for a good contact adhesive.

According to German Laid-Open Application DOS 2,411,169, contact adhesives crosslinkable by ultraviolet radiation can be prepared by using (meth)acrylate copolymers which contain monoolefinically unsaturated ether and ester derivatives of substituted benzophenones as photoinitiators. However, the polymerized benzophenone derivatives have little reactivity to UV radiation, and the pressure sensitive adhesives prepared from the copolymers do not meet high requirements. Furthermore, hotmelt adhesives prepared in this manner have an excessively high melt viscosity, which prevents their use in practice.

European Laid-Open Application 0,246,848 also discloses contact adhesives which are crosslinkable by UV radiation, are based on polyacrylates and contain monoolefinically unsaturated benzophenone derivatives as polymerized photoinitiators. These contact adhesives are intended for use in medicine, for example for plasters, and their adhesion to the skin should not increase in the course of time. However, a disadvantage of these contact adhesives is that they have little reactivity to UV radiation and a comparatively high melt viscosity.

We have found that these objects are achieved and that agents of the type defined at the outset which are curable by ultraviolet radiation and have the advantages described at the outset are obtained when the agents contain copolymers (1) which are obtainable by subjecting a mixture of (A) from 80 to 99.9% by weight of olefinically unsaturated monomers,
(B) from 0 to 10% by weight of a copolymerizable olefinically unsaturated photoinitiator and
(C) from 0 to 10% by weight of a polymerization-regulating photoinitiator to free radical polymerization, the sum of (B) and (C) being not less than 0.1% by weight and the stated percentages by weight being based on the sum of the weights of (A)+(B)+(C).

The present invention accordingly relates to agents which are curable by ultraviolet radiation and are based on a binder formulation of (1) from 99.0 to 20% by weight of a copolymer,
(2) from 1.0 to 80% by weight of monoolefinically unsaturated compounds and
(3) from 0.0 to 20% by weight of polyolefinically unsaturated compounds.

The novel agents contain copolymers (1) which are obtainable by subjecting a mixture of (A) from 80 to 99.9% by weight of olefinically unsaturated monomers,
(B) from 0 to 10% by weight of a copolymerizable olefinically unsaturated photoinitiator and
(C) from 0 to 10% by weight of a polymerization-regulating photoinitiator to free radical polymerization, the sum of (B) and (C) being not less than 0.1% by weight and the stated percentages by weight being based on the sum of the weights of (A)+(B)+(C).

Preferred novel agents contain copolymers (1) which are obtainable by subjecting a mixture of (A) from 80 to 99.9% by weight of olefinically unsaturated monomers,
(B) from 0 to 10% by weight of a copolymerizable olefinically unsaturated photoinitiator and
(C) from 0.1 to 10% by weight of a polymerization-regulating photoinitiator to free radical polymerization, the sum of (B) and (C) being not less than 0.1% by weight and the stated percentages by weight being based on the sum of the weights of (A)+(B)+(C).

Particularly preferred novel agents contain copolymers (1) which are obtainable by subjecting a mixture of (A) from 90 to 99.9% by weight of olefinically unsaturated monomers,
(B) 0% by weight of a copolymerizable olefinically unsaturated photoinitiator and
(C) from 0.1 to 10% by weight of a polymerization-regulating photoinitiator to free radical polymerization, the stated percentages by weight being based on the sum of the weights of (A)+(B) +(C).

Regarding the copolymers (1) to be used according to the invention, the following may be stated specifically:

Component (A)

The copolymers contain, as principal monomers, predominant amounts, ie. 80–99.9, preferably 90–99.5, % by weight of (meth)acrylates of alkanols of 1 to 24 carbon atoms, such as methyl, ethyl, n-propyl, isopropyl, n-butyl, isobutyl, tert-butyl, 2-ethylhexyl, amyl, isoamyl, isooctyl, decyl, lauryl and/or stearyl acrylate and/or methacrylate, and/or vinyl esters of saturated carboxylic acids of 1 to 20 carbon atoms, such as vinyl formate, vinyl acetate, vinyl propionate, vinyl 2-ethylhexanoate, vinyl laurate and vinyl stearate, and/or vinyl ethers of 3 to 22 carbon atoms, such as methyl, ethyl, butyl, hexyl or octadecyl vinyl ether, and/or vinylaromatics of 8 to 12 carbon atoms, such as styrene, α-methylstyrene, vinyltoluenes or tert-butylstyrene, and halostyrenes, and, if required, also monoolefins of 2 to 20 carbon atoms, such as ethylene, propylene, n-butylene, isobutylene, diisobutene, triisobutene and oligopropylenes, and/or diolefins, such as butadiene, and/or vinylhalides, such as vinyl chloride and vinylidene chloride, and/or allyl ethers and/or allyl esters.

The copolymers may furthermore contain up to 20, preferably from 0.25 to 10, % by weight of $\alpha,\beta$-monoolefinically unsaturated acids as polymerized units. For example, mono- and dicarboxylic acids of 3 to 6 carbon atoms and the monoesters of dicarboxylic acids of 4 to 6 carbon atoms with alkanols of 1 to 24 carbon atoms and/or their anhydrides, as well as olefinically unsaturated sulfonic acids and phosphonic acids, such as vinylsulfonic acid and vinylphosphonic acid, are suitable. (Meth)acrylic acid, crotonic acid, maleic acid, fumaric acid, itaconic acid, monomethyl, monobutyl, mono-2-ethylhexyl, monoisoamyl, monoisooctyl and/or monostearyl maleate and/or maleic anhydride, itaconic anhydride and (meth)acrylic anhydride are preferably used.

Another group of copolymers contains up to 20, preferably from 0.5 to 10, % by weight of tetrahydrofurfur-2-yl (meth)acrylate, tetrahydrofurfur-2-yl(meth)acrylamide and/or alkoxy-containing monomers, such as 3-methoxybutyl (meth)acrylate, 2-methoxyathyl (meth)acrylate, 2-butoxyethyl (meth)acrylate and 2-ethoxyethyl (meth)acrylate, preferably tetrahydrofurfur-2-yl (meth)acrylate, as polymerized units.

Another group of copolymers contains from 0 to 20, preferably from 0.25 to 5, % by weight of N-substituted amides as polymerized units, such as N-vinylimidazole, N-vinylpyrrolidone, N-vinylformamide, (meth)acrylamide and mono- and/or dialkyl (meth)acrylamides, such as N-methyl(meth)acrylamide, N-benzyl(meth)acrylamide, N-isobornylmethacrylamide and diacetoneacrylamide.

Monomers containing further functional groups can also be used for the preparation of the copolymers, in amounts of from 0 to 10% by weight, for example hydroxyalkyl (meth)acrylates, such as 2-hydroxypropyl (meth)acrylate, 4-hydroxybutyl (meth)acrylate and 2-hydroxyethyl (meth)acrylate.

The copolymers may furthermore contain up to 10% by weight of polymerized monomers having basic N atoms, such as N,N-diethylaminoethyl (meth)acrylate or N,N-dimethylaminoethyl (meth)acrylate.

Another group of copolymers contains, if necessary in addition to the stated monomers, up to 20% by weight of polymerized monomers which contain heterocyclic and/or homocyclic rings, such as 2-N-morpholinoethyl (meth)acrylate, menthyl (meth)acrylate, cyclohexyl (meth)acrylate or N-isobornyl (meth)acrylate.

In particular, it is also possible to use special reactive adhesion-promoting monomers for the preparation of the copolymers, in amounts of up to 10% by weight, such as 3-methacryloxypropyltrimethoxysilane, vinyltriethoxysilane and vinyltrimethoxysilane.

A particularly preferred group of copolymers (P) contains up to 25, preferably from 0.5 to 5, % by weight of polymerized monomers which contain one or more spacerbonded polar groups capable of forming hydrogen bridges; such monomers can be obtained, for example, by reacting hydroxyalkyl (meth)acrylates with succinic anhydride. N-maleimidohexanoic acid is also suitable. From this group of monomers, the reaction product of 1,4-butanediol mono(meth)acrylate and/or 1,2-ethanediol (meth)acrylate and/or 1,2- and/or 1,3-propanediol (meth)acrylate with succinic anhydride is preferably used.

The copolymers generally have K values, according to DIN 53,726, of from 8 to 100, preferably 12 to 80, particularly preferably from 20 to 70, very particularly preferably from 30 to 55.

For the preparation of copolymers which are suitable for contact adhesives, it is preferable to use monomers whose homopolymers have glass transition temperatures of less than 0° C., preferably those whose homopolymers have glass transition temperatures of less than −10° C., especially copolymers of n-butyl acrylate, of 2-ethylhexyl acrylate, of isoamyl acrylate or of isooctyl acrylate, which generally contain not more than 40% by weight of the other abovementioned monomers as polymerized units.

Component (B)

This class of substances includes photoinitiators which contain a copolymerizable double bond (in general (meth)acrylates) and which are incorporated in the polymer by copolymerization.

Compounds of this type are known. For example, the copolymerizable photoinitiators disclosed in European Laid-Open Application 0,217,205 are particularly suitable, as well as the photoinitiators disclosed in U.S. Pat. No. 3,429,852.

Component (C)

This class of substances includes compounds which, in addition to the group which can be excited by UV radiation, contain substituents which regulate the polymerization (isopropyl group, benzylic hydrogen atoms, -SH(mercapto group) or heteroatom-CHR′R″ groups); these compounds are incorporated in the copolymer by graft copolymerization (because of their regulating property); these compounds are preferably used. Examples of suitable compounds are derivatives of acetophenone, of benzophenone, of benzaldehyde, of xanthone, of thioxanthone, of benzil dimethyl ketals, of benzoin ethers, of 2-hydroxy-2,2-substituted acetophenones, of 3-ketosubstituted cumarins, of benzils and of acylphosphine oxides, which contain an isopropyl, isobutyl and/or isopropylphenyl and/or isobutylphenyl radical and/or radicals which have a secondary, preferably tertiary, hydrogen atom bonded to a carbon atom adjacent to one or two heteroatoms, or carry an -SH(mercapto) group.

For example, 1-(4-isopropylphenyl)-2-hydroxy-2-methylpropan-1-one, isopropylthioxanthone, 4-isopropylbenzophenone,ethyl2,4,6-trimethylbenzovlphenylphosphinate, isopropyl benzoin ether, 2,2-diethoxyacetophenone and ethyl benzoin ether are particularly suitable.

The photoinitiators disclosed in European LaidOpen Application 0,209,831 are also suitable, provided that they carry a polymerization-regulating radical.

The compounds (C) are added to the polymerizing reaction mixture in amounts of from 0 to 10, preferably from 0.5 to 7.5, particularly preferably from 1 to 5, % by weight, the percentages by weight being based on the sum of the weight of A+B+C.

The use of the polymerization-regulating photoinitiators (C) has the advantage that it is possible in some cases to dispense with external regulators and on the other hand the radiation-sensitive group is part of the polymer chain. There are thus advantages with regard to the reactivity and the achievable mechanical properties in the case of, for example, contact adhesives. Furthermore, these compounds are generally simpler to prepare and significantly cheaper than the copolymerizable variants. It can be shown that not less than 20-100% by weight of the added amount of photoinitiator (C) forms part of the copolymers (P).

Moreover, the reactive diluent can be bonded to the polymer chain during irradiation with UV light.

The use of polymerization-regulating photoinitiators is particularly preferred. The presence of copolymerizable photoinitiators (B) is therefore not necessary in every case. An excessively large amount of compound (B) may furthermore increase the degree of crosslinking excessively.

For the preparation of contact adhesives having very good tack and good peel strength, copolymers (1) are therefore prepared without the concomitant use of the compounds (B) and the agents are prepared without the concomitant use of the compounds (3).

Since it is an object of the present invention to reduce the amount of photolysis products capable of migration, as a rule no additional photoinitiators are added to the agents. Nevertheless, photoinitiators may be added to the agents. The stated photoinitiators are among the photoinitiators suitable for this purpose.

Preparation of the copolymers (1)

The copolymers can be prepared by mass, solution or emulsion polymerization using suitable polymerization initiators. Such processes are known, and the preparation of the copolymers can therefore be carried out, for example, similarly to the descriptions in German LaidOpen Applications DOS 2,526,747 and DOS 3,018,131 or European Laid-Open Application 3516, polymerization in solution being preferred.

For polymerization in solution, conventional solvents, for example hydrocarbons, such as benzene, toluene, o-, m- or p-xylene, ethylbenzene, gasolines, nhexane or cyclohexane, esters, such as ethyl acetate, alcohols, such as ethanol, methanol or isopropanol, ethers, such as dioxane or tetrahydrofuran, and mixtures of the stated solvents, may be used.

The amount of the polymerization initiator is in general from 0.01 to 5% by weight, based on the sum of the weights of the monomers (A)+(B) and of the compound(s) (C).

Examples of suitable polymerization initiators are 2,2′-azobisisobutyronitrile (Porofor N), dimethyl 2,2′-azobisisobutyrate (V 601 from Wako), 4,4′-azobis-(4-cyanovaleric acid), peresters, such as tert-butyl perpivalate, tert-butyl peroctoate or tert-butyl perbenzoate, peroxides, such as dibenzoyl peroxide and dilauroyl peroxide, hydroperoxides, such as cumene hydroperoxide, and peroxydicarbonates, such as dicyclohexyl peroxydicarbonate, and ketone peroxides, such as methyl ethyl ketone peroxide and cyclohexanone peroxide.

The stated initiators can be used alone or in combination. It is preferable to use dimethyl 2,2'-azobisisobutyrate in amounts of from 0.1 to 5.0% by weight, based on the amount of the monomers.

For carrying out the polymerization, further compounds which reduce the degree of polymerization can also be added to the reaction mixture, in addition to the stated polymerization-regulating compounds (C). Mercaptans, such as mercaptoethanol, mercaptosuccinic acid, mercaptoglycerol, 3-mercaptopropyltrimethoxysilane or 3-mercaptopropylmethyldimethoxysilane, ethers, such as dioxane, tetrahydrofuran, alcohols, such as isopropanol, hydrocarbons, such as isopropylbenzene, etc. are used for this purpose. Such polymerization regulators are added in amounts of from 0 to 10% by weight, based on the sum of the weights A+B+C.

The copolymers (1) are particularly preferably prepared in the absence of the abovementioned polymerization regulators, ie. the compounds (C), alone or as a mixture, are used as regulators.

To carry out the polymerization in solution, in general some or all of the solvent is heated with some of the monomer mixture and some or all of the polymerization initiator. When the polymerization begins, the remainder of the monomer mixture and, where relevant, the remainder of the polymerization initiator and any solvent are added. The polymerization is preferably effected in highly concentrated solution, preferably at monomer concentrations of more than 50, particularly preferably more than 65, very particularly preferably more than 80, % by weight.

The polymerization can be carried out under superatmospheric pressure, for example from 1 to 100 bar, or atmospheric pressure, at from 50° to 230° C., preferably from 70° to 120° C.

The compound (B), which is used in amounts of from 0 to 10, preferably from 0.01 to 5, very particularly preferably from 0.1 to 2.5, % by weight, based on the sum of the weights of (A)+(B)+(C), is as a rule dissolved in the monomers (A) and added in this form to the polymerizing reaction mixture If necessary, it is also possible to dissolve the compound (B) in a suitable solvent and add this solution to the reaction mixture.

The compound (C), which is used in amounts of from 0 to 10, preferably from 0.1 to 7.5, very particularly preferably from 1.0 to 5, % by weight, based on the sum of the weights of (A)+(B)+(C), is as a rule dissolved directly in the initially taken mixture to be polymerized. In another embodiment of the polymerization, the compound (C) is dissolved in a solvent or in some of the monomer mixture and added to the polymerizing mixture in a time which is shorter than the feed time of the monomer solution, so that monomers still have to be added after the end of the addition of the compound (C).

When the copolymers are used for the preparation of the agents, the solvent (mixture) is distilled off at elevated temperatures after the end of the polymerization. Solvent residues and any volatile constituents are removed under greatly reduced pressure at from 80° to 150° C. The solvents and the volatile constituents can be removed directly from the polymerization kettle; if necessary, the copolymer solution can be fed to a degassing apparatus, after it has been concentrated if required, and can be degassed there.

The copolymers (1) to be used for contact adhesives generally have K values of from 25 to 50. A surprising advantage of the present invention is that copolymers having low K values give contact adhesives which possess very good tack and excellent shear strength. Low K values are particularly advantageous because the copolymers can be more readily freed from volatile constituents and the agents having a relatively high polymer content nevertheless have a low viscosity.

The K value of the copolymer depends on the desired properties, in particular on the desired viscosity of the agents.

The choice and combination of the monomers (A) depends on the intended use of the UV-crosslinkable copolymers.

By selecting and matching the components (B) and (C), it is possible to prepare copolymers which have low K values but, when mixed with suitable reactive diluents, can nevertheless be cured rapidly by UV radiation. The achievable degree of crosslinking can be established very simply by the amount of (B) and (C) used.

However, in special applications, it is also possible to dispense with the compound (B) and to adjust the photoreactivity, ie. adapt it optimally to an existing radiation source, by means of a combination of suitable photoinitiators (C).

In particular, the choice of components (B) and (C) depends on their UV absorption spectra and their extinction coefficients; thus, simple optimal adaptation to existing UV lamps is still possible.

Regarding the monoolefinically unsaturated compounds (2) to be used for the purpose according to the invention, ie. the reactive diluents, the following may be stated specifically:

Suitable reactive diluents are all the abovementioned monomers which are liquid at room temperature. Monomers which are solid at room temperature and can be dissolved in the liquid monomers are also to be considered as reactive diluents in this sense.

However, it is preferable to use reactive diluents having a boiling point of 100° C., particularly preferably >125° C. The reactive diluents disclosed in European Patent 0,088,300, which can be used alone or mixed in any ratio, are particularly preferred.

Even if the copolymers (1) have a solubility of only 20% by weight in the reactive diluents, a very high polymer content is still desirable. Copolymer contents of more than 45, particularly preferably more than 55, very particularly preferably more than 65, % by weight are preferred, the percentages by weight being based on the sum of the weights of components (1), (2) and (3).

Regarding the polyolefinically unsaturated compounds (3) which can be used in accordance with the invention, the following may be stated:

Suitable compounds of this type include di-, triand tetra(meth)acrylate compounds and compounds having a larger number of (meth)acrylate groups, for example 1,4-butanediol di(meth)acrylate, tripropylene glycol tri(meth)acrylate, polytetrahydrofuran-250 di(meth)acrylate or polytetrahydrofuran-2000 di(meth)acrylate, the integer indicating the number average molecular weight. The compounds (3) are added to the agents in amounts of from 0 to 20, preferably from 0.01 to 5, % by weight. Di(meth)acrylates having a number average molecular weight of more than 250 g/mol are preferred and are added to the agents in amounts of from 0.0 to 5% by weight, the percentages by weight being based on the sum of the weights of components (1), (2) and (3).

Regarding the novel agents as such, the following may be stated:

The agents can be modified and/or compounded in a conventional manner.

When the agents are used as contact adhesives, for example the conventional tackifiers, such as hydrocarbon resins, unmodified or modified rosins, terpene/phenol resins, ketone resins, aldehyde resins, homopolymers, such as poly-2-ethylhexyl (meth)acrylate, polyisoamyl (meth)acrylate, polyisobutyl acrylate or poly-nbutyl acrylate, and corresponding copolymers, cumarone/indene resins, plasticizers based on mono-, di- or polyester compounds, polychlorinated hydrocarbons, liquid paraffins, natural and synthetic rubber, polyvinyl ethers or other modifiers, may be added.

Examples of suitable tackifiers are polyvinyl ethers, such as polyvinyl isobutyl ether, and poly-nbutyl acrylate. The tackifiers can be added to the novel agents in amounts of from 0 to 50% by weight. The novel agents can be used as filling compounds, sealants, laminating agents, coating agents, impregnating agents and adhesives which are crosslinkable by UV radiation.

The novel agents are suitable for the production of coatings and laminates and for impregnation, in particular for the production of pressure sensitive films, pressure sensitive labels, one-sided and double-sided pressure sensitive adhesive tapes, electrical insulating tapes and blocking foils.

The agents can be applied by means of conventional application units, if necessary at elevated temperatures, in general from 20° to 150° C., preferably from 50° to 100° C., particularly preferably from 50° to 80° C., in a conventional manner by spreading, spraying, roller coating, knife coating or pouring, to sheet-like substrates, for example to paper, cardboard, pulp, wood, metals or films, for example of plasticized PVC, polyethylene, polyamides, polyethylene glycol terephthalate or, in particular, polypropylene, or foils, eg. aluminum.

The coated substrates are finally crosslinked by exposure to ultraviolet light, readily adhering coatings which have high cohesion and very good peel strength in combination with excellent aging resistance being obtained in the case of the contact adhesives. The crosslinked waterproof coatings do not exhibit blooming when stored in water.

Irradiation of the coated substrates can be effected in a conventional manner using light from UV lamps, for example low pressure, medium pressure and high pressure mercury lamps of different powers, for example of 80 W/cm, 100 W/cm or 120 W/cm; the choice of the lamp depends on, inter alia, the absorption spectrum of the copolymers and of the compounds (B) and (C) used.

Lamps having a relatively high power generally permit more rapid crosslinking. One, two or more lamps operate in a plant, depending on the speed at which the coated substrate passes through the UV unit.

Testing the performance characteristics (see Tables 1 and 2 below)

The adhesive properties of sheet-like substrates which have a contact adhesive layer can be determined by measuring the shear strength as a measure of the cohesion and the peel strength as an overall measure of cohesion and surface tack.

For the test, polyethylene glycol terephthalate films are coated with the novel agents so that the amount applied per unit area is 25 g/m$^2$.

The coated films are placed on a moving continuous belt and passed at speeds of from 10 to 20 m/min under two UV lamps (medium pressure Hg lamps) which are arranged one behind the other and each of which has a power of 80 W/cm. Irradiation is effected under a nitrogen atmosphere.

The films produced in this manner are cut into 2 cm wide strips and these strips are applied to a chromium-plated brass sheet. The sheet together with the strips is then stored for 24 hours at 23° C. and 65% relative humidity.

To measure the peel strength, the test strips are peeled off backward, parallel to the adhesive layer, at a speed of 300 mm/min. The force required for this purpose is measured.

In the measurement of the shear strength, a bonded area measuring 20×45 mm is cut out, the sheet is clamped vertically and the projecting part of the adhesive strip is loaded with a weight of 1 kg. The time taken to break the adhesive bond is determined. The measurement is carried out at 23° C. and 50° C. All measurements are carried out 5 times.

In the Examples which follow, parts and percentages are by weight. The K values are determined according to DIN 53,726, in 1% strength solution in tetrahydrofuran at 25° C.

In all Examples below, a mixture of versatic monoesters comprising 50 parts of 2,3-dihydroxypro-p-1-yl acrylate and 50 parts of 1,3-dihydroxyprop-2-yl acrylate, according to European Patent 0,088,300 (reactive diluent) is used as the monoolefinically unsaturated compound (2).

The viscosities were calculated from the flow curves recorded using a plate-and-cone system.

The following copolymers mentioned in the Examples were prepared in a conventional polymerization apparatus equipped with a stirrer, various feed vessels, a reflux condenser, an inert gas connection, a heating-/cooling means and various monitoring thermometers and for operation under superatmospheric and reduced pressure.

EXAMPLE 1

The remainder of the monomer mixture is added in the course of 3 hours to a gently refluxing mixture of 250 g of ethyl acetate, 5 g of 2,2'-azobisisobutyronitrile and 300 g of a monomer mixture of 610 g of 2-ethylhexyl acrylate, 375 g of vinyl acetate and 15 g of acrylic acid. Stirring is continued for 2 hours, after which a solution of 2 g of tert-butyl per-2-ethylhexanoate in 178 g of ethyl acetate is added. After the end of the addition, stirring is continued for a further 2 hours.

A copolymer (1) having a K value of 65 is obtained.

45 parts of copolymer (1) are mixed with 65 parts of reactive diluent (2) and 2 parts of 2,4,6-trimethylbenzoyldiphen-ylphosphine oxide.

EXAMPLE 2

The procedure described under Example 1 is followed, but 40 g of 1-(4-isopropylphenyl)-2-hydroxy-2-methylpropan-1-one are added to the initially taken mixture.

A copolymer (1) having a K value of 45 is obtained.

60 parts of copolymer (1) are mixed with 40 parts of reactive diluent (2).

EXAMPLE 3

The procedure described under Example 1 is followed, but 20 g of 1-(4-isopropylphenyl)-2-hydroxy-2-methylpropan-1-one are added to the initially taken mixture.

A copolymer (1) having a K value of 51 is obtained.

55 parts of copolymer (1) are mixed with 45 parts of reactive diluent (2).

EXAMPLE 4

The procedure described in Example 1 is followed, but 20 g of isopropyl 2,4,6-trimethylbenzoylphenylphosphinate are added to the initially taken mixture.

A copolymer (1) having a K value of 48 is obtained.

55 parts of copolymer (1) are mixed with 45 parts of reactive diluent (2).

EXAMPLE 5

A copolymer (1) is prepared by polymerization of 73% by weight of n-butyl acrylate, 10% by weight of 2-ethylhexyl acrylate, 10% by weight of methyl acrylate, 5% by weight of acrylic acid, 2% by weight of diacetoneacrylamide and 1% by weight of Uvecryl P 36 (copolymerizable photoinitiator from UCB) with the addition of 4% by weight of isopropyl 2,4,6-trimethylbenzoylphenylphosphinate and 1% by weight of 2,2'-azobisisobutyronitrile, said copolymer having a K value of 47.

55 parts of copolymer (1) are mixed with 45 parts of reactive diluent (2).

EXAMPLE 6

The procedure described in Example 5 is followed, but Uvecryl P 36 is replaced by the same amount of 4-methacryloyloxyphenyl 2-hydroxyprop-2-yl ketone.

55 parts of copolymer (1) are mixed with 45 parts of reactive diluent (2) and 2 parts of polytetrahydrofuran-650 diacrylate as polyolefinically unsaturated compound (3).

EXAMPLE 7

The procedure described in Example 5 is followed, but the addition of Uvecryl P 36 is dispensed with.

TABLE 1

| | Irradiation conditions | |
| --- | --- | --- |
| Example No. | Amount applied per unit area [g/m²] | Belt speed [m/min] |
| 1 | 25 g | 10 |
| 2 | 25 g | 10 |
| 3 | 25 g | 10 |
| 4 | 25 g | 10 |
| 5 | 25 g | 10 |
| 6 | 25 g | 10 |
| 7 | 25 g | 10 |

TABLE 2

| Results of performance test as contact adhesives | | | | | |
| --- | --- | --- | --- | --- | --- |
| | Shear strength [h] at | | Peel strength [N/2 cm] | | |
| Example No. | 23° C. | 50° C. | Immediately | after 24 h | Tack* |
| 1 | >24 | 6 | 4.3 | 7.6 | Good |
| 2 | >24 | >24 | 3.5 | 7.2 | Good |
| 3 | >24 | >24 | 7.4 | 11.5 | Good |
| 4 | >24 | >24 | 6.5 | 9.0 | Good |
| 5 | >24 | >10 | 4.0 | 6.5 | Satisfactory |
| 6 | >24 | >10 | 2.5 | 5.5 | Satisfactory |
| 7 | >24 | >10 | 7.0 | 10.5 | Satisfactory |

*The tack was evaluated by a group.

We claim:

1. A composition which is curable by ultraviolet radiation and is based on a binder formulation of:
   1) from 99.0 to 20% by weight of a copolymer,
   2) from 1.0 to 80% by weight of monoolefinically unsaturated compounds, and
   3) from 0 to 20% by weight of polyolefinically unsaturated compounds,
   wherein the composition contains a copolymer (1) which is obtainable by subjecting to a free-radical-initiated polymerization a mixture of:
   (A) from 20 to 99.9% by weight of olefinically unsaturated monomers,
   (B) from 0 to 10% by weight of a copolymerizable olefinically unsaturated photoinitiator,
   (C) from 0.1 to 10% by weight of a polymerization-regulating initiator selected from the group consisting of 1-(4-isopropylphenyl)-2-hydroxy-2-methylpropane-1-one, isopropyl thioxanthone, 4-isopropylbenzophenone, ethyl2,4,6-trimethylbenzo-ylphenylphosphinate, isopropyl benzoin ether, 2,2-diethoxyacetophenone and ethyl benzoin ether; which initiator reduces the degree of polymerization of the copolymer (1) during the free-radical-initiated polymerization, the sum of (B) and (C) being not less than 0.1% by weight and the stated percentages being based on the sum of the weights of (A)+(B)+(C).

2. The composition of claim 1, wherein in said copolymer (1) component (A) is used in an amount of from 80 to 99.9% by weight.

3. The composition of claim 1, wherein said copolymer (1) component (A) is used in an amount of from 90 to 99.9% by weight.

4. The composition of claim 1, wherein said component (A) comprises methacrylates of alkanols of 1 to 24 carbon atoms, vinyl esters of saturated carboxylic acids of 1 to 20 carbon atoms, vinyl ethers of 3 to 22 carbon atoms or vinyl aromatics of 8 to 12 carbon atoms or a combination thereof.

5. The composition of claim 1, wherein said component (A) comprises polymerized monomers which contain one or more spacerbonded polar groups capable of forming hydrogen bridges.

6. The composition of claim 1, wherein said component (A) has a K value of from 8 to 100.

7. The composition of claim 6, wherein said component (A) has a K value of from 12 to 80.

8. The composition of claim 7, wherein said component (A) has a K value of from 12 to 70.

9. The composition of claim 1, wherein in said copolymer (1) component (B) comprises a (meth)acrylate.

10. The composition of claim 1, wherein in said copolymer (1) component (B) is used in an amount of from 0.01 to 5% by weight.

11. The composition of claim 1, wherein in said copolymer (1) component (B) is used in an amount of from 0.1 to 2.5% by weight.

12. The composition of claim 1, wherein in said copolymer (1) component (C) is used in an amount of from 0.1 to 7.5% by weight.

13. The composition of claim 1, wherein in said copolymer (1) component (C) is used in an amount from 1.0 to 5% by weight.

* * * * *